Figure 1:
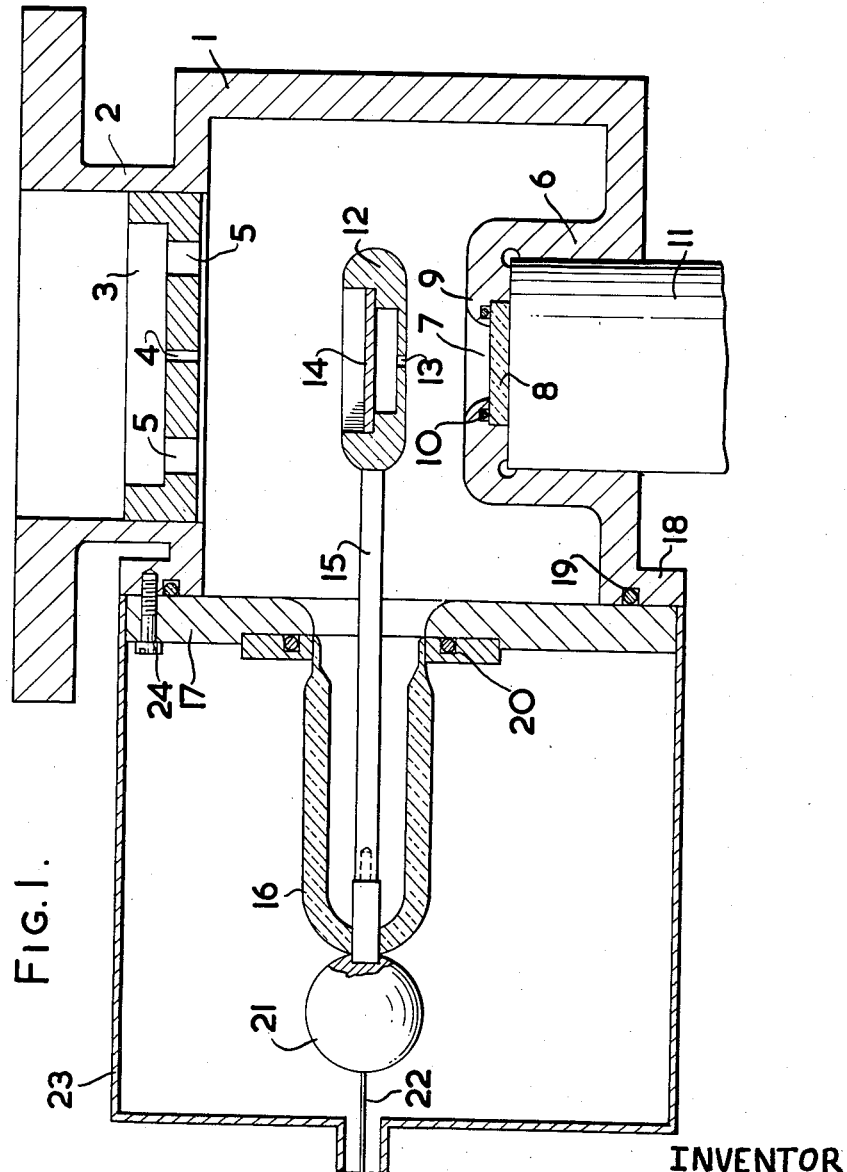

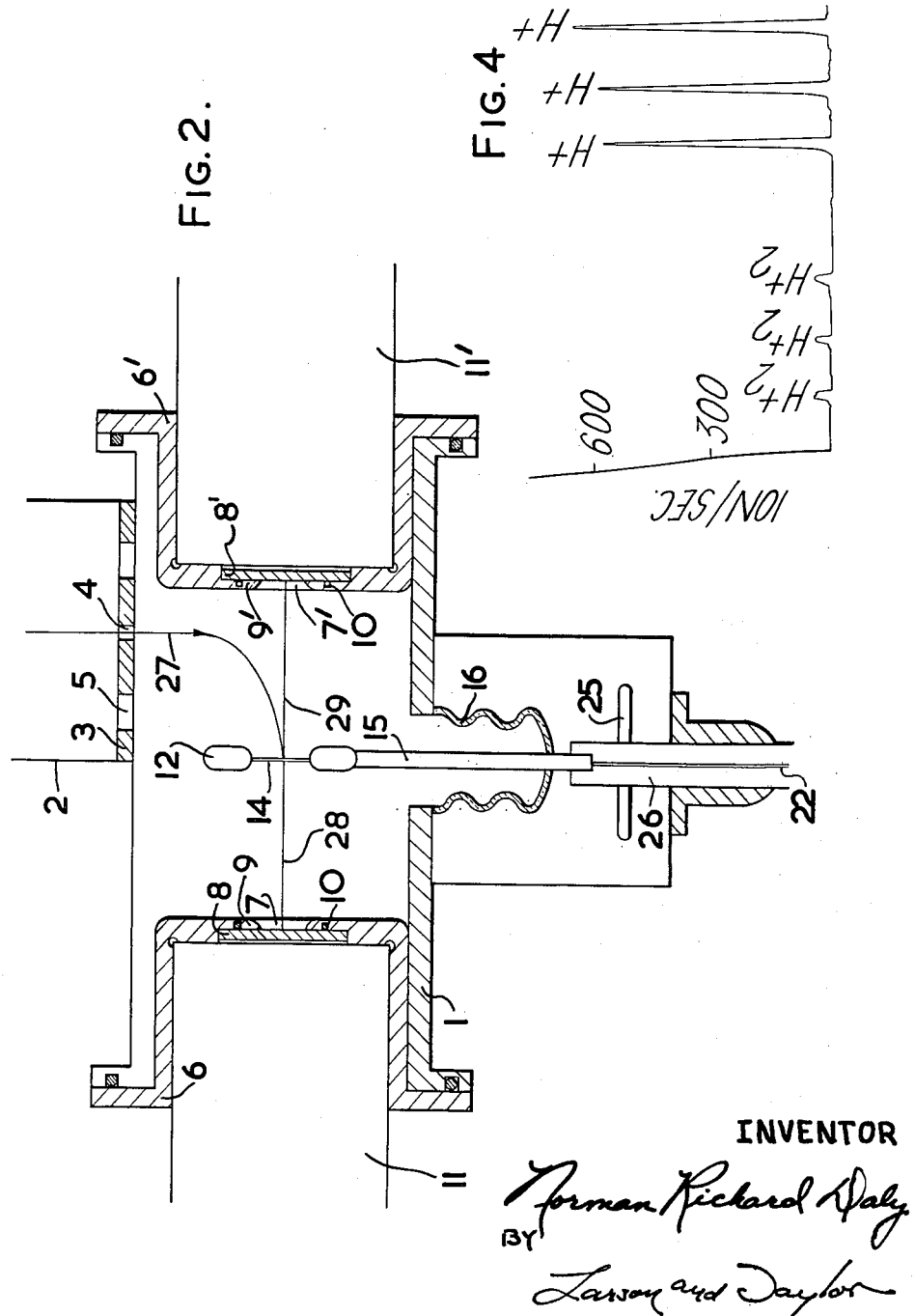

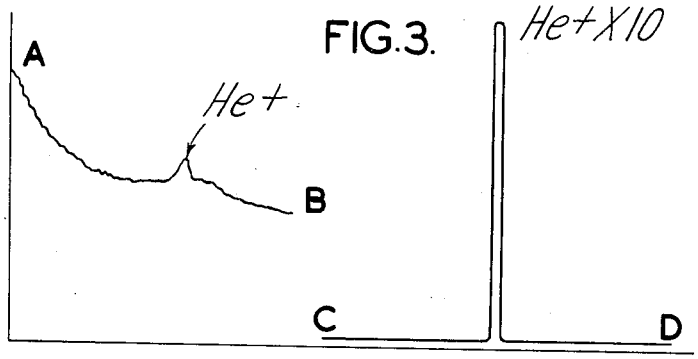
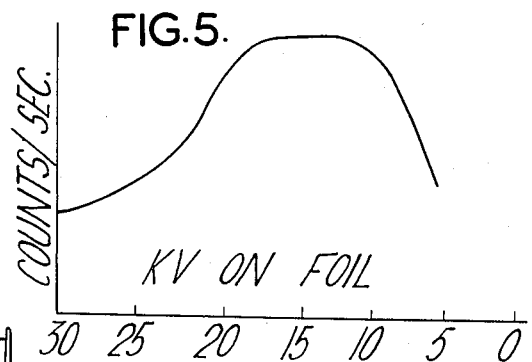
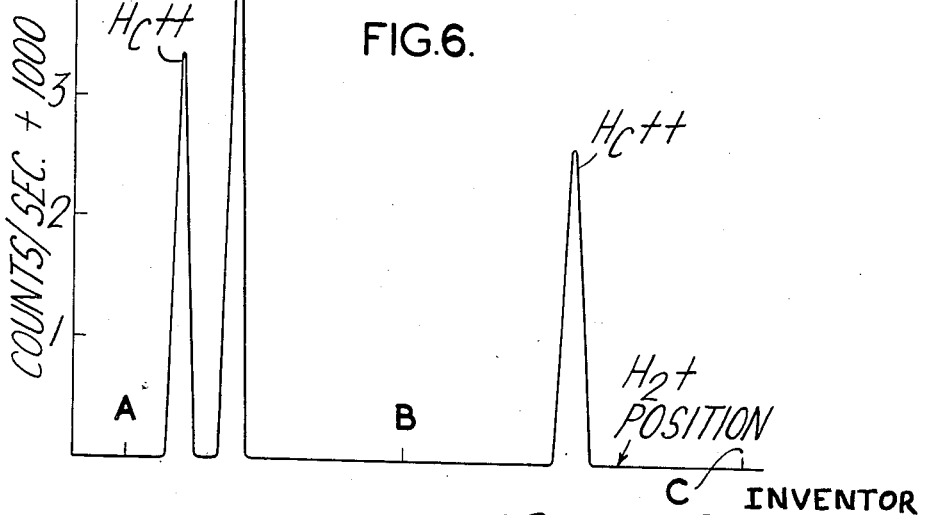

United States Patent Office 3,041,453
Patented June 26, 1962

3,041,453
POSITIVE ION DETECTOR
Norman Richard Daly, Woodley, Reading, England, assignor to the United Kingdom Atomic Energy Authority, London, England
Filed July 6, 1960, Ser. No. 41,140
Claims priority, application Great Britain July 31, 1959
10 Claims. (Cl. 250—41.9)

This invention relates to detectors for ions, particularly for positive ions. It relates especially to ion detectors for use with mass spectrometers. A persistent difficulty in the mass analysis of ions has been the effect of interfering ions which tend to produce background signals in the detectors. It is extremely difficult to distinguish the signals due to a component of a mixture when it is present in only small proportion, for example a small proportion of helium present in a large quantity of air is very difficult to detect. It is also extremely difficult to distinguish between ions of the same mass and charge but of different species. The interference caused by such ions can be most undesirable. For example the $H_2^+$ ion can interfere with the $D^+$ ion.

Another and related point is that, with the advance of ultra high vacuum techniques in mass spectrometry, a need has arisen for a leak detector having greater sensitivity. It has been proposed to probe with acetone and use a sensitive pressure gauge as leak detector, and it has been proposed to probe with helium and pass the helium through two magnetic analysers to remove interfering ions. The ion detection sensitivity of a leak detector could be increased by a factor of about one thousand by using an electron multipher to detect the ion current, but unfortunately this added sensitivity is normally swamped by the background due to ions of wide mass number distribution scattered or dissociated by the residual gas or the walls of the mass spectrometer. They reach the detector although their change to mass ratios should make this impossible.

An object of the invention is to provide an ion detector which has an improved sensitivity.

A further object of the invention is to provide an ion detector which can substantially suppress unwanted background signals.

A still further object of the invention is to provide an ion detector which can distinguish between ions of the same mass and charge but having a different number of constituent nuclei.

By means of the invention it is thus possible to distinguish between $H_2^+$ and $D^+$ ions, between $H_3^+$ and $HD^+$ ions and between $He^+$ and "air" ions.

The invention is particularly adapted for use in mass spectrometers, where the ions are positively charged.

The invention consists in an ion detector comprising a vacuum vessel having means defining an aperture for passage of an ion beam, a thin foil mounted to offer a front face to the said ion beam and having a thickness which is such that desired ions incident on the said face can penetrate the foil to liberate secondary electrons from the back of the foil but undesired ions cannot, and an electron detector mounted to receive the said secondary electrons to produce signals.

The mode of action of the foil can be explained with reference to its effect on a beam consisting of monoenergetic ions $He^+$, $N^+$ and $N_2^+$. $N^+$ and $N_2^+$ are typical "air" ions. The range of low energy particles in the foil is proportional to $E/Z^{\frac{1}{2}}$ where E is the energy and Z the atomic number of the ion. Thus the $N^+$ ion because of its higher Z will not penetrate as far as the $He^+$ ion. The $N_2^+$ ion will dissociate on entering the foil and the two particles formed each have approximately half the energy and consequently half the range of the $N^+$ ion. If the foil thickness is such that the $He^+$ ion can just penetrate to the back of the foil and release a secondary electron there, this electron can be used to signal the arrival of the $He^+$ ion at the face of the foil. The ions $N^+$ and $N_2^+$ have a much smaller probability of releasing secondary electrons and hence produce no significant signals.

The use of the foil in a mass spectrometer can be illustrated with respect to the $H^+$ and $H_3^+$ ions.

If the foil is connected to a $-30$ kv. potential and the initial energy of the ion is 6 kev. then the incident energy of the ion on the film is 36 kev. The energies of chemical bonds rarely exceed 10 e.v. and the energies of the bonds in the $H_3^+$ ion will be less than this figure. Therefore the $H_3^+$ ion has sufficient kinetic energy to cause it to disintegrate when it collides with the atoms of the metal foil. If there is complete disintegration of the ion then each separate H atom or ion will have an energy of about 12 kev. and will be unable to penetrate the film.

This behaviour contrasts markedly with that of an atomic $H^+$ ion. The atomic ion has an incident energy of 36 kev. and cannot disintegrate to dissipate any energy. It therefore can penetrate the film and cause electron emission from the other side.

Particular embodiments of the invention will now be described with reference to the accompanying drawings wherein:

FIGURE 1 is a sectional elevation;
FIGURE 2 is a diagrammatic sectional elevation; and
FIGURES 3 to 6 are graphical representations of scans through various ion beams.

In FIGURE 1 a stainless steel vacuum vessel 1 has a flanged extension 2 for attachment to a mass spectrometer (not shown). Extension 2 contains a plate 3 having a slit 4 and pumping holes 5. Vessel 1 has a recessed portion 6 having an aperture 7. Aperture 7 is closed by an organic scintillator 8 fitting against shoulders 9 carrying an O-ring seal 10. A photomultiplier 11 fits into the recessed portion 6 and presses firmly against the scintillator 8. The organic scintillator 8 is Ne-102 made by Nuclear Enterprises and on its upper surface there is a layer of aluminium about $0.05\mu$ thick. Scintillator 8 has a very short decay time, $5 \times 10^{-9}$ seconds, and is 65 percent as efficient as anthracene. It is formed as a disc 4 cm. in diameter and ⅛ inch thick. A silicone oil is provided between the scintillator 8 and the photomultiplier 11 to give a good optical contact with the photomultiplier.

A polished stainless steel holder 12 has a slit 13 parallel to slit 4. Holder 12 supports a thin aluminium foil. Holder 12 is a push fit into an arm 15 having a threaded nut screwed into a Kovar glass metal seal 16. Seal 16 fixed to a plate 17 which sits on a flat milled on the side of flange 18 of vessel 1 and plate 17 is held to the flange by screws 24. An O-ring 19 is provided between flange 18 and plate 17 and similarly an O-ring 20 is provided between the glass metal seal 16 and plate 17. An anticorona ball 21 fixed on top of the seal 16 has a lead 22 for connection to any suitable negative potential. The negative potential has the effect of providing automatic amplification. It accelerates the positive ions on to the disc 14 and accelerates the electrons away from the disc 14. A can 23 keeps light out of the detector. All metal parts are highly polished and all sharp corners have been rounded to prevent corona discharge.

To operate the detector shown in FIGURE 1 it is attached to a mass spectrometer by flanged portion 2, and the interior is taken down to vacuum by pumping through the holes 5. Holder 12 is connected to a $-25$ kv. potential and vessel 1 is earthed. A positive ion beam from the mass spectrometer passes through slit 4 and strikes disc 14. Electrons emitted from the lower surface of disc 14 pass through slit 13 and strike the scintillator 8. The photo-electrons emitted by the scintillator are converted by the photomultiplier to electrical pulses which can be amplified and counted as desired.

It should be noted that in the detector illustrated in FIGURE 1 the photomultiplier 11 can be removed without destroying disc 8, thus allowing replacement of the photomultiplier without letting air into vessel 1.

In FIGURE 2 vessel 1 has a flanged extension 2 for attachment to a mass spectrometer (not shown). Extension 2 contains a plate 3 having a slit 4 and pumping holes 5. Vessel 1 has a recessed portion 6' having an aperture 7'. Apertures 7 and 7' are closed by organic scintillators 8 and 8'n fitting against shoulders 9 and 9' carrying O-ring cylinders 10 and 10'n. Photomultipliers 11 and 11' fit into the recessed portions 6 and 6' and press firmly against scintillators 8 and 8'. The polished stainless steel holder 12 supports a thin film 14 of aluminium of thickness 100 $\mu$gm./sq. cm. (micrograms per square centimeter). Holder 12 is a push fit into an arm 15 having a threaded nut screwed into a Kovar glass metal seal 16. An anti-breakdown guard ring 25 of polystyrene is fixed on the insulator 26 containing a lead 22 attached to arm 15. Line 27 indicates the path of an ion beam from the mass spectrometer, line 28 indicates the path of electrons emitted by atomic ions penetrating the foil 14 and line 29 indicates the path of electrons emitted by molecular and atomic ions impinging on foil 14.

The apparatus shown in FIGURE 2 is operated in a manner similar to that shown in FIGURE 1. When a mixed molecular and atomic ion beam 27 strikes the aluminium foil 14 secondary electrons proportional to the total number of ions are emitted along path 29, and are counted by means of photomultiplier 11'. Atomic ions penetrate foil 14 and cause the emission of electrons along line 28 in proportion to the number of atomic ions penetrating the film. These electrons are also counted by means of photomultiplier 11. This detector thus provides a direct result for the efficiency of the detector, i.e. the number of atomic ions which are incident on one side of film 14 to the number releasing secondary electrons at the far side.

Tests were carried out on an aluminum foil using the detector as illustrated in FIGURE 2.

The aluminum foil used was 75 $\mu$gm./sq. cm. and prepared by vacuum coating on glass. It was floated off on water, and lifted on a small ring which was a push fit in the foil holder. This was held by a rod of about 1 cm. in diameter in a one inch Kovar to glass seal, corrugated to increase the surface track length to earth.

The detector was mounted on a twelve inch radius 90° mass spectrometer, fitted with a conventional electron impact gas source. This source had no electron beam collimating magnet.

A pure helium sample was used to find the absolute transmission of the thin aluminium foil for helium ions. The source conditions were adjusted to give 10,000 counts/sec. on photomultiplier 11' and with 30 kv. on the foil photomultiplier 11 counted 7,500 ions/sec., i.e. a transmission of 75% for He+ ions.

Air was now allowed to leak into the spectrometer to a pressure of about $1 \times 10^{-5}$ mm. Hg. FIGURE 3 shows two scans through mass four for natural helium air mixture.

AB is scanned downwards in mass and represents the output from photomultiplier 11, CD is the simultaneous scan output from photomultiplier 11 multiplied by a factor of ten. On AB the helium peak shows up as a small rise on the broad background scattered air ions, on CD a sharply defined peak appears. The base line for this peak is raised above the true base line by an amount that represents 1/400th of full scale deflection. (One thousand ions per second.) Since the noise on the photomultiplier 11 with no beam was 2–3 ions/sec., this accounts fully for the departure from the true base line. The rejection factor for scattered ions is thus greater than 4000 since at A the total current is 4,000 ions per second.

In FIGURE 4 are shown three scans through a beam of $H^+$, $H_2^+$ and $H_3^+$ ions. Results were obtained with the thin film held at a potential of −25 kv. at which the noise level was approximately $5 \times 10^{-19}$ amps. and the sensitivity was greater than 50 percent for $H^+$ ions. The number of $H_2^+$ ions in the ion beam was approximately 50 times the number of $H^+$ ions. $H^+$ ions were also present. Three runs were made through the $H^+$, $H_2^+$ and $H_3^+$ regions. It can be seen that the $H_2^+$ ions were almost completely rejected. No $H_3^+$ ions penetrated the film.

A second mechanism contributes towards the rejection of scattered air ions by this detector. FIGURE 5 shows the variation of scattered ion currents near mass four, with voltage on the aluminum foil.

It can be seen that the total ion current rises sharply as the the voltage falls and that even when the foil is at 16 kv. this current is still larger than at 30 kv. This can be explained as follows. As the voltage on the foil is reduced ions that have lost energy before entering the detector, can now strike the foil nearer its centre point. Outside a certain radius on the foil ions are lost since the secondary electrons they release will not enter the phosphor; the effective diameter of which is 9 mm. The more energy an ion has lost, the more the foil voltage must be reduced so that the ion may strike the foil inside this sensitive radius.

The shape of the curve on FIGURE 5 will be very distorted towards the low voltage end since, at 6 kv. for example, the efficiency of the phosphor for detection electrons must have fallen very sharply.

As a consequence of the second rejection effect, curve AB in FIGURE 3 does not give a true representation of the ratio of helium ions to scattered ions entering the detector. The scattered ion part of the curve should be much larger but a definite value cannot be put to the factor by which it should be increased. However, one can say that the rejection factor 4000 found previously would probably be 10,000 or better.

The transmission properties of different types of foils of various thicknesses have been investigated for many types of light ion.

| Foil Material | Thickness, $\mu$g./cm.$^2$ | $H^+$ | $H_2^+$ | $H_3^+$ | $D^+$ | $HD^+$ | $D_2^+$ | $He^+$ | $He^{++}$ |
|---|---|---|---|---|---|---|---|---|---|
| | | Percent | Percent | Percent | Percent | Percent | Percent | Percent | Percent |
| Aluminium | 90 | 71 | 10 | 0.37 | 81 | 50 | 45 | 48 | 84 |
| Do | 100 | 54 | 1.1 | 0.10 | 64 | 29 | 15 | 25 | 76 |
| Do | 115 | 40 | 0.25 | 0.02 | 48 | 20 | 6 | 16 | 50 |
| Carbon | 70 | 60 | 1.7 | 0.25 | 72 | 34 | 19 | 4.5 | |
| Gold | 200 | 51 | 8.1 | 1.60 | 66 | 28 | 28 | 14 | 57 |

The results for some foils are shown in the above table. They are all taken with 10,000 ions/sec. striking one side of the foils and show the percentage of ions transmitted. In the case of the 90 $\mu$g./cm.$^2$ aluminium foil, it can be seen that for hydrogen the transmission falls off sharply for $H_2^+$ and $H_3^+$. The transmission for $D^+$ is greater than for $H^+$, as expected from the shape of the energy loss curves below 100 kev. for these ions. The transmission for $He^+$ is always less than for $H^+$, although the ranges for these two ions were the same in aluminium at similar energies. $He^{++}$ has a high transmission since it has twice the energy of the other ions.

The 115 $\mu$g./cm.$^2$ aluminium foil shows a very large drop in transmission for $He^+$ and $H_3^+$ while still giving high transmission for the atomic ions $H^+$, $D^+$, $He^+$ and $He^{++}$.

Carbon foils show the same general properties as aluminium foils.

Gold foils have high transmission for atomic and molecular ions. This may be due to the fact that they are more granular in structure than the others, or to the fact that for a given thickness in $\mu$g./cm.$^2$ less atoms are present due to the high atomic weight, with a resultant increase in the percentage range straggle of the ions relative to the foil thickness.

Appearance potential measurements on $He^{++}$ have been troubled by $H_2^+$ ions from the residual background gas in mass spectrometers, occurring at the same mass number. A further example of the molecular ion rejection property of this detector is shown in FIGURE 6. AB shows the response of photomultiplier 11' to a mixture of hydrogen and helium gas being bled into the spectrometer: BC shows the response of photomultiplier 11. The $He^{++}$ peak has been slightly attenuated and the arrow at the $H_2^+$ position shows that this peak has been eliminated.

A problem arises in the analysis of deuterium to hydrogen ratios near to natural, i.e. about one part in six thousand, caused by the formation in the ion source of the complex ion $H_3^+$. The problem can be solved by drawing a graph for the mass 3/mass 2 peak against total pressure as measured by the pass 2 peak and determining the ratio for zero intensity of $H_2$ by extrapolation of the straight line plot obtained. The intercept gives the H to D ratio.

Reference to Table 1 shows that for the 90 $\mu$g./sq. cm. aluminium foil the transmission for HD ions was 50% and for $H_3^+$ ions was 0.37%. Therefore one measurement can give the H to D ratio directly if the detector has been calibrated for the transmission of HD ions.

I claim:

1. An ion detector comprising a vacuum vessel having means defining an aperture for passage of an ion beam, a thin foil mounted to offer a front face to the said ion beam and having a thickness which is such that desired ions incident on the said face can penetrate the foil to liberate secondary electrons from the back of the foil but undesired ions cannot, and an electron detector mounted to receive the said secondary electrons to produce signals.

2. An ion detector as recited in claim 1, said means being provided to connect the foil to a source of electric potential of polarity opposite to that of the ions.

3. An ion detector as recited in claim 1 in which a second electron detector is mounted to receive secondary electrons emitted from the said front face.

4. An ion detector as recited in claim 1 wherein the said foil is mounted at an angle to, and to one side of, the direction of the ion beam at the said aperture, means providing and holding a charge on the foil whereby the ion beam is bent on to the face of the foil, a first electron detector being mounted in space relationship to the foil to detect secondary electrons emitted from the said back and a second electron detector being mounted in space relationship with said foil to detect secondary electrons emitted from the said front face.

5. An ion detector as recited in claim 1 wherein the foil is supported on a film of plastic organic material substantially transparent to said secondary electrons.

6. An ion detector as recited in claim 1 wherein the said foil comprises aluminium.

7. An ion detector as recited in claim 1 wherein the said foil comprises carbon.

8. An ion detector as recited in claim 1 wherein the said foil comprises gold.

9. An ion detector as recited in claim 5 in which the said film comprises a polyamine.

10. In a mass spectrometer an ion detector as recited in claim 1.

References Cited in the file of this patent

UNITED STATES PATENTS

| | | |
|---|---|---|
| 2,720,593 | Richards et al. | Oct. 11, 1955 |
| 2,769,911 | Warmoltz | Nov. 6, 1956 |
| 2,854,583 | Robinson | Sept. 30, 1958 |
| 2,950,388 | White | Aug. 23, 1960 |